Aug. 26, 1958
S. G. KRAMER
2,849,271
KITCHEN UTENSIL HOLDING DEVICES
Filed July 15, 1955
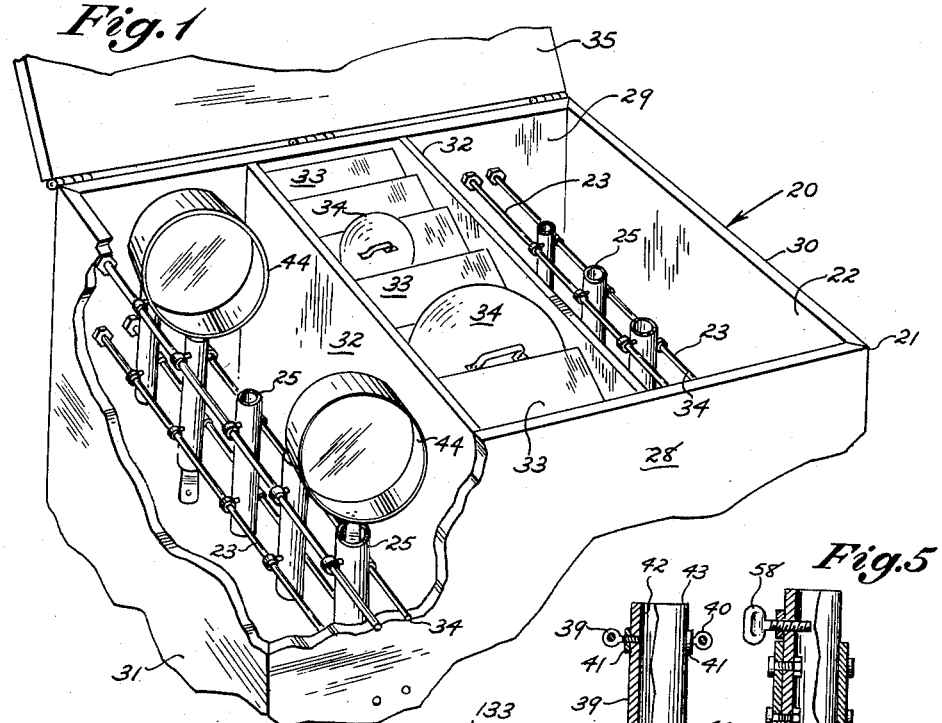
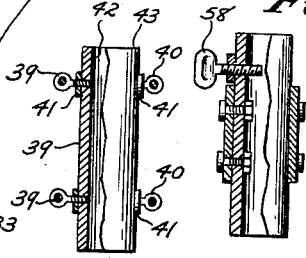
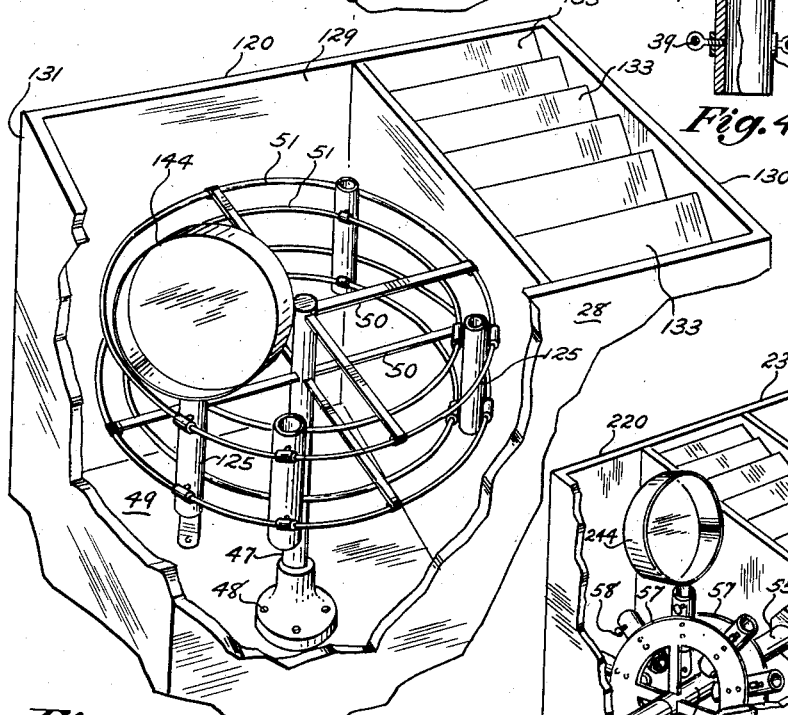
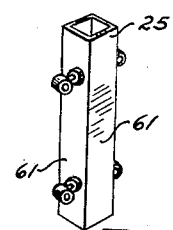
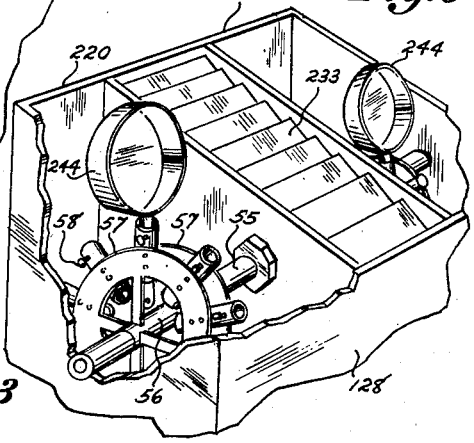

United States Patent Office 2,849,271
Patented Aug. 26, 1958

2,849,271
KITCHEN UTENSIL HOLDING DEVICES
Samuel G. Kramer, Spring Glen, N. Y.
Application July 15, 1955, Serial No. 522,360
1 Claim. (Cl. 312—350)

This invention relates generally to the field of partition equipment, and more particularly to an improved form of holding or storing device adapted to hold kitchen utensils in an easily accessible position in such manner that they may occupy a minimum amount of space. In the prior art, it is known to store such utensils in drawers, or on shelves in stacked relationship so that when the lowermost utensil in the stack is desired, it is necessary to shift the position of all of those stacked above the same. Very often, it is necessary to empty an entire drawer to obtain any desired implement, thus causing unnecessary loss of time and consequent annoyance.

It is among the principal objects of the present invention to provide improved utensil storing construction adapted to engage individual utensils by the elongated handle portion thereof, after which the utensil may be moved to a position wherein it may be instantly obtained when desired, and without disturbing other similarly stored utensils.

Another object of the invention lies in the provision of structure of the class described in which the cost of fabrication may be of a reasonably low order, with consequent wide sale, distribution and use.

A further object of the invention lies in the provision of utensil storing construction possessed of the above-enumerated advantages, which may be adapted for use in conjunction with cabinet storing space of over a wide variety of shaped areas, thereby suiting the device for installation in a wide variety of situations.

Still another object of the invention lies in the provision of combination cabinet means for storing kitchen utensils in which provision is made for separate storage of the lids or covers of such utensils.

These objects, as well as other incidental ends and advantages, will become more clearly apparent during the course of the following disclosure, and be pointed out in the appended claim.

On the drawing, to which reference will be made in the specification, similar reference characters have been employed to designate corresponding parts throughout the several views.

Figure 1 is a fragmentary view in perspective, partially broken away for purposes of clarity, of a first embodiment of the invention.

Figure 2 is a similar view in perspective showing a second embodiment of the invention.

Figure 3 is a similar view in perspective showing a third embodiment of the invention.

Figure 4 is a view in elevation, partly in section, showing one of the individual hollow handle engaging elements which comprises a part of the embodiment.

Figure 5 is a similar view having specific application to the third embodiment shown on Figure 3.

Figure 6 is a view in perspective of an alternate form of holding element which may be used in conjunction with any of the embodiments shown on Figures 1, 2 and 3.

In accordance with the invention, the device, the first embodiment of the invention, generally indicated by reference character 20, comprises broadly: a cabinet element 21 having a plurality of storing compartments 22, some of which are equipped with support element guide rods 23, upon which are disposed a plurality of hollow handle engaging elements 25.

The cabinet element 21 may be of any suitable rectangular shape, and fabricated of sheet metal, wood or other suitable material. It includes a forward wall 28, a rearward wall 29, side walls 30 and 31, as well as a plurality of interior walls 32, which form the compartments 22, mentioned hereinabove. A plurality of angularly disposed shelves 33 may be provided to accommodate the lids or covers 34 of the various kitchen utensils supported by the elements 25.

The guide rods 24 are preferably four in number and maintained in parallel relationship, as shown on Figure 1, by engaging the same with the forward and rearward walls 28 and 29. The length of the rods will be determined by the dimensions of the cabinet element 21, and their disposition within the same. As shown on the first embodiment, they are arranged to extend from the front to the rear of the cabinet element, but, if desired, side to side arrangements are also suitable.

The hollow handle engaging elements 25 are substantially similar, and accordingly, a description of one of such elements will serve equally well to describe the others. The elements 25 are preferably formed from short lengths of hollow cylindrical tubing, and are provided with a plurality of rod engaging eye members 40 suitably arranged to simultaneously engage all of the guide rods 23 in such manner that the elements 25 are held in substantially vertical position, although they may be slid along the length of the rods. As shown on Figure 4, the eye members 40 are maintained in threaded engagement with the elements 25 by a plurality of small lock nuts 41. An axially disposed bore 42 is of sufficient diameter to engage the elongated handle members of the utensils, 44, so that the upper edge 43 of the elements 25 contact the rim portions of the utensils, where the handle is of relatively small cross section, or the sides of the handle elements where the same are of tapered configuration.

In use, the selection of a particular utensil requires merely the grasping of the main body portion of the same and withdrawing it from the respective handle engaging element 25. Where large numbers of utensils are stored, it is possible to slide some of the respective handle engaging elements 25 to a less accessible position at the rear of the cabinet element while maintaining those utensils frequently used at or near the forward wall of the same. As shown on Figure 1, it is not necessary that any of the utensils contact each other, and each individual utensil may be removed without disturbing the position of the other.

Turning now to the second embodiment of the invention, as shown on Figure 2 of the drawing, parts corresponding to those of the first embodiment have been designated by similar reference characters with the additional prefix "1."

The second embodiment of the invention differs from the first embodiment in the provision of a vertically disposed post element 47 having a base member 48 secured to a lower wall 49 of the cabinet element 121. The vertical post element 47 includes bearing means (not shown) which permit the same to rotate about its axis, with corresponding movement of the supporting arms 50 which support curved rods 51. In addition to movement permissible between the elements 125 and the rods 51, it is possible to rotate the arms 50 to bring utensils stored at rear of the cabinet element 21 to a forward position where they may be more easily grasped by the user.

Turning now to the third embodiment of the invention as shown on Figure 3 of the drawing, parts corresponding to those of the first embodiment have been designated by similar reference characters with the additional prefix "2."

The third embodiment of the invention differs from the first and second embodiment in the provision of a horizontally disposed post element 55 mounted for rotation about its axis and supporting one or more wheel members 56, each having a pair of flanges 57 disposed in radial relationship with respect to the axis of the post element 55. Disposed between the flanges 57, are the handle engaging elements 225, which are provided with set screw means 58 (see Figure 5) to maintain the utensils in position when the same have been rotated through substantially 180 degrees wherein the handle element is disposed above the main body portion of the individual utensil. In the third embodiment, the guide rods 23 of the first embodiment are eliminated, as rotation of the post element 55 is a relatively simple matter.

Turning now to the alternate form of handle engaging element indicated on Figure 6 by reference character 25′, this differs from the principal form principally in the provision of a rectangular cross section, rather than a circular one. This form is particularly useful where the handle elements are of a generally non-circular configuration with regard to the cross-section of the same, as it prevents rotation of the utensil about an axis through the center of the element 25′ without the necessity of locking the handle member as in the third embodiment.

It may thus be seen that I have invented novel and highly useful improvements in implement storing devices for use in conjunction with kitchen utensils of well-known types. The device as illustrated may be manufactured at low cost using simple stampings and extrusions, without the necessity of resorting to machined parts. Cabinet elements known and existing in the art may be readily adapted for use in conjunction with the inventive structure, these cabinets forming a part of the large number of cabinets normally installed in contemporary kitchens. The device requires only ordinary skill in use, and requires no adjustments of substantial nature once initially installed.

I wish it to be understood that I do not consider the invention limited to the exact details of structure shown and set forth in this specification, for obvious modifications will occur to those skilled in the art to which the present invention relates.

I claim:

A kitchen storing device for use in storing culinary articles having handle portions thereon comprising: a handle engaging element of hollow configuration, and a plurality of guiding rods; said handle engaging element being slidably associated with said guiding rods.

References Cited in the file of this patent

UNITED STATES PATENTS

| | | |
|---|---|---|
| 817,956 | Carman | Apr. 17, 1906 |
| 1,343,363 | Hall | June 15, 1920 |
| 1,385,375 | Hormes | July 26, 1921 |
| 1,457,587 | Maibrunn | June 5, 1923 |
| 1,761,382 | Akalis | June 3, 1930 |